(12) United States Patent
Kim et al.

(10) Patent No.: US 8,160,033 B2
(45) Date of Patent: Apr. 17, 2012

(54) APPARATUS AND METHOD FOR TRANSMITTING AND RECEIVING PACKETS IN A MOBILE COMMUNICATION SYSTEM SUPPORTING HYBRID AUTOMATIC REPEAT REQUEST

(75) Inventors: Soeng-Hun Kim, Suwon-si (KR); Gert Jan Van Lieshout, Middlesex (GB); Hwan-Joon Kwon, Suwon-si (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 891 days.

(21) Appl. No.: 12/187,762

(22) Filed: Aug. 7, 2008

(65) Prior Publication Data

US 2009/0040976 A1 Feb. 12, 2009

(30) Foreign Application Priority Data

Aug. 7, 2007 (KR) .................. 10-2007-0079246
Nov. 8, 2007 (KR) .................. 10-2007-0113640

(51) Int. Cl.
  *H04J 3/00* (2006.01)
(52) U.S. Cl. ........................ 370/336; 370/348
(58) Field of Classification Search .................. None
  See application file for complete search history.

(56) References Cited

U.S. PATENT DOCUMENTS

| 7,321,589 B2 * | 1/2008 | Lohr et al. ............ 370/394 |
| 7,366,477 B2 * | 4/2008 | Sebire et al. ............ 455/69 |
| 7,657,815 B2 * | 2/2010 | Seidel et al. ............ 714/748 |
| 2004/0037224 A1 | 2/2004 | Choi et al. |
| 2004/0088634 A1 | 5/2004 | Kim et al. |
| 2008/0101286 A1 * | 5/2008 | Wang et al. ............ 370/329 |
| 2009/0103500 A1 * | 4/2009 | Malkamaki et al. ...... 370/336 |

FOREIGN PATENT DOCUMENTS

| EP | 1 389 848 | 8/2002 |
| EP | 1 746 855 | 7/2006 |
| RU | 2 251 219 | 4/2005 |
| RU | 2 282 310 | 8/2006 |
| WO | WO 2005/088886 | 9/2005 |
| WO | WO 2005/125226 | 12/2005 |
| WO | WO 2006/101347 | 9/2006 |

* cited by examiner

*Primary Examiner* — Kwang B Yao
*Assistant Examiner* — Alex Skripnikov
(74) *Attorney, Agent, or Firm* — The Farrell Law Firm, P.C.

(57) ABSTRACT

An apparatus and method for transmitting and receiving packet data in a mobile communication system supporting Hybrid Automatic Repeat reQuest (HARQ), e.g., a method and apparatus for performing HARQ retransmission on a packet received through persistent resources where no HARQ process identifier is transmitted. HARQ soft combining is performed by providing a mapping relation between a packet received through persistent resources and a retransmitted HARQ packet. In addition, when there are several HARQ packets received through persistent resources at an arbitrary timing, which packet an arbitrary retransmission packet should be combined is determined, thereby enabling the corresponding processor to perform correct soft combining. This improves HARQ performance of persistent resources without increasing complexity of the reception apparatus.

16 Claims, 12 Drawing Sheets

APPARATUS AND METHOD FOR TRANSMITTING AND RECEIVING PACKETS IN A MOBILE COMMUNICATION SYSTEM SUPPORTING HYBRID AUTOMATIC REPEAT REQUEST

PRIORITY

This application claims priority under 35 U.S.C. §119(a) to a Korean Patent Application filed in the Korean Intellectual Property Office on Aug. 7, 2007 and assigned Serial No. 2007-79246, and a Korean Patent Application filed in the Korean Intellectual Property Office on Nov. 8, 2007 and assigned Serial No. 2007-113640, the disclosures of both of which are incorporated herein by reference.

BACKGROUND OF THE INVENTION

1. Field of the Invention

The present invention relates generally to an apparatus and method for transmitting and receiving packets in a mobile communication system, and in particular, to an apparatus and method for transmitting and receiving packets in a mobile communication system supporting Hybrid Automatic Repeat reQuest (HARQ).

2. Description of the Related Art

Mobile communication systems, which were conventionally developed to provide communication services for mobile users, are evolving to provide various additional services as they progress toward the $3^{rd}$ Generation (3G) standard through the $1^{st}$ and $2^{nd}$ Generation standards. More specifically, mobile communication systems are developing to provide packet data services while providing voice services as their basic services. Despite the development of the mobile communication systems, the voice services are still expected to keep their status as the key services.

Long Term Evolution (LTE), one of the next generation mobile communication systems, standardization work on which is now in progress in the $3^{rd}$ Generation Partnership Project (3GPP), is determining a way to provide voice services using a Voice over Internet Protocol (VoIP) technique. In providing the voice services using the VoIP technique, persistent resource allocation is used to avoid the burden of transmitting resource allocation information for all VoIP packets. The term "persistent resource" as used herein refers to transmission resources that are periodically allocated to a particular User Equipment (UE) without separate allocation information. VoIP packets are normally provided using persistent resources because the voice services should continually be allocated with the resources for a predetermined time.

When the persistent resources are provided only for HARQ initial transmission or first HARQ transmission, the normal resources are provided for HARQ retransmissions.

FIG. 1 is a diagram illustrating transmission and reception of VoIP packets through persistent resources. Referring to FIG. 1, persistent resource intervals 165 provide VoIP communication service to an arbitrary UE. The hatched downlink persistent resources 105, 145, and 170 are allocated in every persistent resource interval 165.

A UE receives a downlink packet through the first persistent resource 105. The UE checks for an error in the downlink packet. If there is an error in the downlink packet, the UE transmits an HARQ Negative Acknowledge (NACK) signal 110 using an uplink resource at a predetermined timing. Thereafter, an Evolved Node B (ENB) provides information indicating transmission of an HARQ retransmission packet to the UE through a control channel at an arbitrary timing denoted by reference numeral 115, and transmits the HARQ retransmission packet at a timing denoted by reference numeral 120. Upon receiving the HARQ retransmission packet, the UE soft-combines it with an HARQ packet stored in an HARQ process, and checks for an error therein. If an error still exists, the UE retransmits an HARQ NACK signal 125 through an uplink resource at a predetermined timing. If the error still exists, even after a predetermined number of HARQ retransmissions, the UE ends the retransmission routine. However, before the predetermined number of retransmissions are made, the UE repeats the operation of soft-combining the HARQ retransmission packet with the packet stored in its associated process until the error is removed through the HARQ retransmissions.

As described above, the HARQ operation is a technique for soft-combining a packet having an error with its retransmitted packet, thereby reducing an error possibility of the packet. During HARQ retransmission, the ENB includes resource allocation information and an HARQ process identifier together in Layer 1 (L1)/Layer 2 (L2) control information, which is transmitted through a predetermined downlink control channel, to notify the UE of an HARQ process, a packet stored in which should be soft-combined with an arbitrary HARQ retransmission packet. For example, as illustrated in FIG. 1, a retransmission packet with an HARQ process identifier=x is soft-combined with a packet stored in a process with an HARQ process identifier=x.

However, when the persistent resources are used, no L1/L2 control information is transmitted in initial HARQ transmission or first n HARQ transmissions. In this case, even the HARQ process identifier is not transmitted. Therefore, because the reception device cannot map the packet received through the persistent resources to the retransmitted HARQ packet, it cannot normally perform HARQ soft-combining. In addition, when there are several HARQ packets received through persistent resources at an arbitrary timing, it is not clear with which packet an arbitrary retransmission packet should be soft-combined.

If the persistent resource interval 165 expires before the HARQ operation of the packet received through the first persistent resource 105 is completed, i.e., if the corresponding persistent resource interval 165 expires when the NACK signal has been transmitted three times and 2 retransmissions have been made, as illustrated in FIG. 1, the next persistent resource interval starts, so a new packet may be transmitted through the second persistent resource 145.

However, the UE checks for an error of a downlink packet even for the new packet received through the persistent resource 145 of the next interval, and if there is an error in the downlink packet, the UE transmits a NACK signal 150 through uplink transmission resources for transmitting a NACK/ACK signal at a predetermined timing for the UE. Thereafter, when a retransmitted packet is received, currently, there is no way to determine whether the retransmitted packet is a retransmission packet for the packet 105 whose retransmission was not completed in the previous interval, or whether the retransmitted packet is a retransmission packet for the packet 145 received through resources allocated in the current persistent resource interval.

SUMMARY OF THE INVENTION

Accordingly, the present invention has been designed to address at least the above problems and/or disadvantages and to provide at least the advantages described below. An aspect of the present invention is to provide an apparatus and method for soft-combining packets using persistent resources in a mobile communication system supporting HARQ.

Another aspect of the present invention is to provide an apparatus and method for reducing soft-combining error for retransmission packets in a mobile communication system supporting HARQ.

Another aspect of the present invention is to provide an apparatus and method for preventing unnecessary retransmission due to soft-combining error for retransmission packets in a mobile communication system supporting HARQ.

Another aspect of the present invention is to provide an apparatus and method for transmitting and receiving HARQ packets.

In accordance with an aspect of the present invention, a method is provided for identifying persistent resources by a User Equipment (UE) in a mobile communication system that transmits the persistent resources using Hybrid Automatic Repeat reQuest (HARQ). The method includes receiving and storing a HARQ identifier previously designated during allocation of persistent resources; and detecting an error of a packet using a preset HARQ identifier upon receipt of packet data, and performing reception processing on a retransmission packet.

In accordance with another aspect of the present invention, a method is provided for identifying persistent resources by an Evolved Node B (ENB) in a mobile communication system that transmits the persistent resources using Hybrid Automatic Repeat reQuest (HARQ). The method includes previously defining a HARQ identifier during allocation of persistent resources, and setting up a call; and transmitting a packet using a preset HARQ identifier during packet data communication.

In accordance with another aspect of the present invention, a User Equipment (UE) apparatus is provided for identifying persistent resources in a mobile communication system that transmits the persistent resources using Hybrid Automatic Repeat reQuest (HARQ). The UE apparatus includes a reception unit for performing demodulation and decoding on received data; a HARQ process including a normal process for HARQ packet reception and a HARQ process for persistent resources; and a controller for receiving and storing a HARQ identifier previously designated during allocation of persistent resources, and controlling reception of a retransmission packet using the HARQ identifier based on the persistent resources upon receipt of the retransmission packet.

In accordance with another aspect of the present invention, an Evolved Node B (ENB) apparatus is provided for identifying and transmitting persistent resources in a mobile communication system that transmits the persistent resources using Hybrid Automatic Repeat reQuest (HARQ). The ENB apparatus includes a HARQ process including a normal process for HARQ packet transmission and an HARQ process for persistent resources; a HARQ identifier manager for managing a persistent resource-dedicated HARQ process identifier to be used for a User Equipment (UE) to which it will allocate persistent resources; and a controller for previously determining the HARQ identifier from the HARQ identifier manager during allocation of persistent resources to a particular UE, and transmitting a packet using a preset HARQ identifier during packet data communication.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Further, terms used herein are defined based on functions in the present invention and may vary according to users, operator intention, or usual practices. Therefore, the definition of the terms should be made based on contents throughout the specification.

The present invention will be described herein with reference to 4 preferred embodiments. In a first embodiment of the present invention, a UE and an ENB previously agree upon an identifier of a HARQ process that they will use for a HARQ operation of a packet received through persistent resources, in order to combine it with a packet received through persistent resources during retransmission, using the previously agreed identifier of the HARQ process.

In the second and third embodiments of the present invention, when a packet has been received through persistent resources and there are several packets for which HARQ reception has not been completed, it is possible to determine a process, data in which should be soft-combined with the HARQ-retransmitted packet. Accordingly, the present invention provides an apparatus and method for setting up several HARQ processes for persistent resources (hereinafter referred to as "persistent resource-dedicated HARQ processes"), and defining a mapping relation between packets received through persistent resources and identifiers of HARQ processes using a predetermined rule.

A fourth embodiment of the present invention provides a method for identifying a HARQ process where a packet subject to soft-combining is stored, using a retransmission number.

First Embodiment

In the first embodiment of the present invention, an ENB signals, to a UE to which persistent resources will be allocated, an identifier of a persistent resource-dedicated HARQ process and a soft-buffer size of the HARQ process through a call setup process. The UE and the ENB perform HARQ retransmission associated with a HARQ packet, which is later transmitted and received through persistent resources through the persistent resource-dedicated HARQ process.

Figure 1:
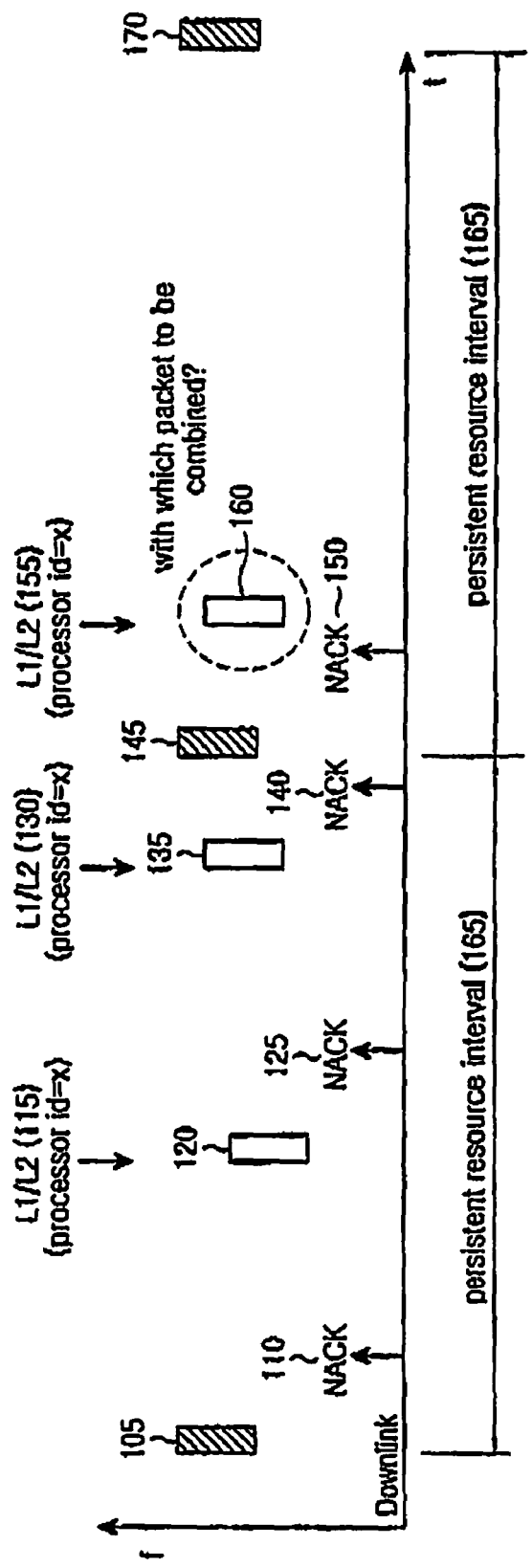
FIG. 1 is a diagram illustrating transmission and reception of VoIP packets through persistent resources.
Figure 2:
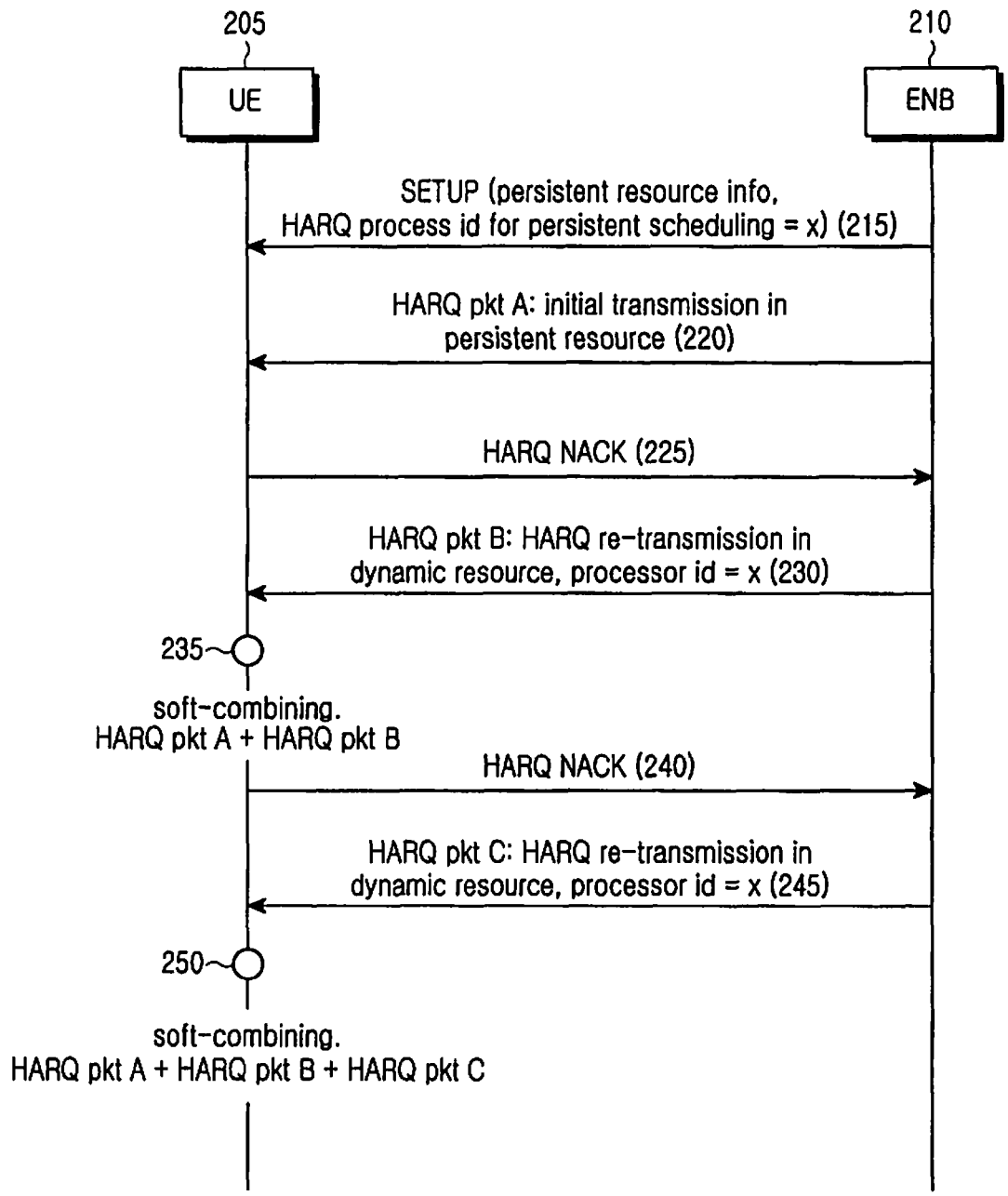
FIG. 2 is a signal flow diagram illustrating a procedure for transmitting and receiving HARQ retransmission packets between an ENB and a UE according to a first embodiment of the present invention.

FIG. 2 is a signal flow diagram illustrating a procedure for transmitting and receiving HARQ retransmission packets between an ENB and a UE according to the present invention.

Referring to FIG. 2, in a communication system including a UE 205 and an ENB 210, the ENB 210 transmits, in step 215, persistent resource-related information, and an identifier and soft-buffer size of a persistent resource-dedicated HARQ process to the UE 205 through a call setup message, such as a radio bearer setup message. The term "persistent resource-dedicated HARQ process" as used herein refers to a HARQ process, which will be used for an HARQ operation of a packet received through persistent resources. For ease of explanation, an identifier of the persistent resource-dedicated HARQ process will be referred to herein as "x". The persistent resource-related information can be, for example, an interval of persistent resources. Information on the resources to be used as persistent resources can be transmitted when actual data transmission and reception is impending.

The HARQ process identifier indicates a HARQ process, data stored in which should be soft-combined with the HARQ retransmission packet. The HARQ process includes therein a soft buffer for storing an HARQ packet having an error, and the HARQ process identifier is information indicating a soft buffer, data stored in which should be soft-combined with an arbitrary HARQ packet. Upon receipt of the set message, the UE 205 identifies a HARQ process identifier and a HARQ process buffer size it will use for a packet received through persistent resources, and sets up a HARQ process having a soft buffer with the identified size. Further, the UE 205 identifies the HARQ process as a persistent resource-dedicated HARQ process.

When the persistent resources are allocated to the UE 205, the ENB 210 transmits a packet through the persistent resources at a predetermined time. Therefore, the UE 205 receives the transmitted packet in step 220. Only first n HARQ transmissions can be carried out through the persistent resources. In the following description, n will be assumed to be 1. In other words, only initial HARQ transmission is carried out through the persistent resources. The packet received through persistent resources in step 220 will be referred to herein as a "packet A". Because packet A is transmitted through persistent resources, no L1/L2 control information is transmitted. Therefore, a HARQ process identifier for the packet A is not transmitted.

The UE 205 performs an error detection process, such as a Cyclic Redundancy Check (CRC) calculation, on the initial-transmitted packet A. If there is an error, the UE 205 stores the packet received through the persistent resources in a HARQ process x, agreed upon as a persistent resource-dedicated HARQ process. Herein, because the L1/L2 control information is not signaled together in the HARQ packet received through the persistent resources, reference cannot be made to the HARQ process identifier, which is signaled along with the HARQ packet. Therefore, the present invention previously assigns a HARQ process for the HARQ packet received through persistent resources, and stores the HARQ packet received through persistent resources in the previously assigned HARQ process.

Thereafter, in step 225, the UE 205 transmits a negative HARQ feedback, i.e., a HARQ NACK, through transmission resources, such as a response channel, at a predetermined time. For example, the HARQ feedback can include 1-bit information.

Upon receipt of the negative HARQ feedback in step 225, the ENB 210 performs HARQ retransmission at a proper timing denoted by reference numeral 230, and if the corresponding HARQ retransmission is persistent resource-related HARQ retransmission, the ENB 210 includes the HARQ process identifier x, which was agreed upon in the call setup process in an L1/L2 control channel before transmission. The UE 205, which transmitted the negative HARQ feedback for the HARQ packet received through persistent resources, monitors the L1/L2 control channel to check if there is any HARQ packet scheduled thereto, in order to receive the HARQ packet transmitted in step 230. This check can be made through the HARQ process identifier.

More specifically, as an arbitrary HARQ packet is scheduled to the UE 205, if the HARQ packet is not a initial-transmitted HARQ packet, but is instead a retransmitted HARQ packet and a HARQ process identifier of the HARQ packet is a HARQ process identifier x agreed upon for persistent resources, the UE 205 can determine that the retransmitted HARQ packet is persistent resource-related retransmission. Therefore, in step 235, the UE 205 soft-combines the HARQ packet retransmitted in step 230 with the data stored in the process x, which is a persistent resource-dedicated HARQ process.

Accordingly, when the retransmission HARQ packet received in step 230 is defined as a HARQ packet B, the UE 205 soft-combines the HARQ packet A with the HARQ packet B in step 235. After the soft-combining, the UE 205 performs an error detection process, such as CRC, to determine if there is an error. If the error still exists, despite the soft-combining, in step 240, the UE 205 transmits a negative HARQ feedback using transmission resources, such as a response channel, at a predetermined time.

In response, in step 245, the ENB 210 retransmits the HARQ packet using the agreed transmission resources at a predetermined time. In this case, the previously agreed x is used as the HARQ process identifier of the retransmitted HARQ packet, indicating that the retransmitted HARQ packet is persistent resource-related retransmission.

Upon sensing HARQ retransmission including a HARQ process identifier through an L1/L2 control channel in step 245, the UE 205 identifies that the retransmitted HARQ packet is persistent resource-related retransmission. Thereafter, the UE 205 soft-combines the HARQ packet with the data stored in a soft buffer identified by the process identifier x, and checks for an error therein. For example, if the HARQ packet received in step 245 is referred to as a HARQ packet C, the UE 205 soft-combines the HARQ packet C received along with the HARQ process identifier x, with the data stored in the HARQ process x, i.e., the data obtained by soft-combining the HARQ packet A with the HARQ packet B. The UE 205 continues the HARQ operation until a predetermined condition is satisfied, for example, until there is no error in the soft-combined HARQ packet or the retransmission has reached a maximum number of retransmissions.

Figure 3:
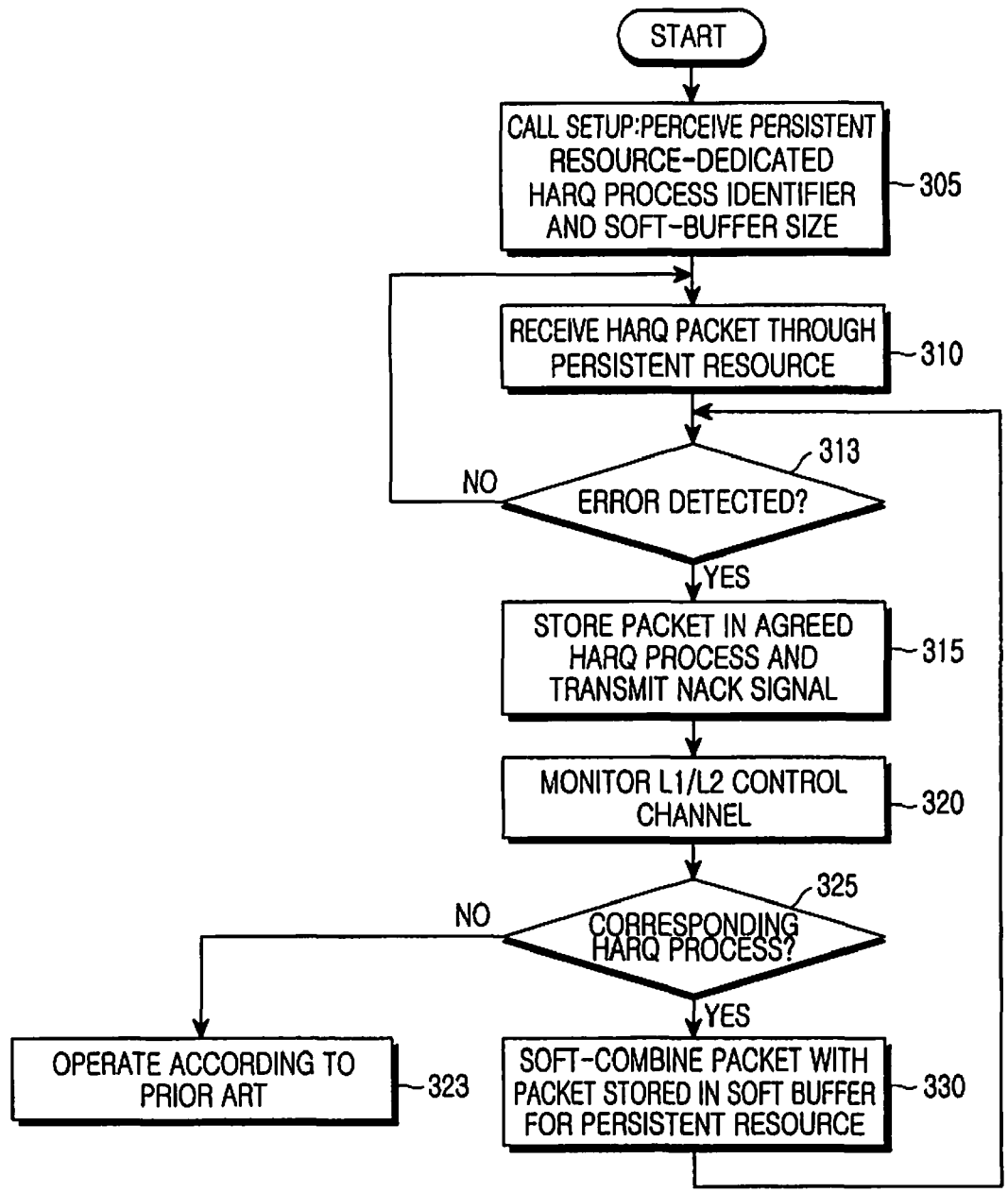
FIG. 3 is a flowchart illustrating an operation of HARQ-receiving persistent resources in a UE according to the first embodiment of the present invention.

FIG. 3 is a flowchart illustrating an operation of HARQ-receiving persistent resources in a UE according to the present invention.

Referring to FIG. 3, in a call setup process of step 305, the UE receives a signal including an identifier and a soft-buffer size of a persistent resource-dedicated HARQ process. The UE assigns a soft buffer corresponding to the soft-buffer size as a soft buffer for persistent resources, and maps the soft buffer to the HARQ process identifier.

When persistent resources are allocated to the UE, the UE receives a HARQ packet through the persistent resources in step 310. Upon receipt of the HARQ packet, the UE performs CRC calculation on the HARQ packet in step 313 to check if there is an error in the HARQ packet. If there is no error, the UE delivers the HARQ packet to an upper layer, and then waits until an HARQ packet is received through persistent resources in step 310.

However, if there is an error in step 313, in step 315, the UE stores the packet received through persistent resources in the agreed persistent resource-dedicated HARQ process, and transmits a negative response signal (NACK) through a response channel. Thereafter, in step 320, the UE monitors an L1/L2 control channel to receive HARQ retransmission. Thereafter, the UE checks, in step 325, if there is a HARQ packet scheduled thereto. This check can be made by checking if a HARQ process identifier of the HARQ packet corresponds to an identifier of the persistent resource-dedicated HARQ process. Therefore, in step 325, if the HARQ process is the agreed HARQ process, in step 330, the UE soft-combines the received HARQ packet with the HARQ packet stored in the assigned persistent resource-dedicated HARQ process. Thereafter, the UE performs an error detection operation in step 313. The UE repeats the HARQ operation until the predetermined condition is satisfied.

However, if the HARQ process is not the agreed HARQ process in step 325, in step 323, the UE performs a predetermined necessary operation corresponding to the above-described prior art. That is, the UE performs an operation of determining a HARQ process, data in which it will soft-combine with the HARQ packet, depending on the HARQ process identifier of the received HARQ packet, checking for an error therein, and transmitting HARQ feedback information.

By previously appointing an identifier and a soft-buffer size of the scheduled persistent resource-dedicated HARQ process, as described above, the UE can determine with which HARQ retransmission packet it should combine the HARQ packet received through persistent resources, without L1/L2 control information.

Second Embodiment

As described above, in the first embodiment of the present invention, only one persistent resource-dedicated HARQ process is allocated. However, this restricts HARQ retransmission for an arbitrary persistent resource to be completed before until a persistent resource allocation timing of a next interval. That is, when there is only one persistent resource-dedicated HARQ process identifier, it is not possible to determine whether HARQ retransmission 160 is retransmission for the HARQ packet 145 transmitted through persistent resources, or for the HARQ packet 105 transmitted through persistent resources. As a result, the HARQ retransmission still cannot be carried out after the next persistent resource allocation timing.

Therefore, to solve this problem, a second embodiment of the present invention assigns several persistent resource-dedicated HARQ processes, and defines a rule in which persistent resource-used timings and persistent resource-dedicated HARQ processes are mapped on a one-to-one basis.

For example, if an HARQ process x and an HARQ process y are assigned for persistent resources and an arbitrary HARQ packet is received through persistent resources at a time z, an equation is defined such that the timing information z is mapped to the HARQ process x or HARQ process y on a one-to-one basis, thereby making it possible to determine the timing, persistent resources allocated at which are mapped to the HARQ packet received along with the process identifier x or y at an arbitrary timing. Because the persistent resources are periodically allocated at regular intervals as stated above, there are several possible methods for replacing the timing at which persistent resources are allocated with a cyclic integer, and a preferred example thereof will be given below.

Most mobile communication systems include a system counter that increases at intervals of predetermined time to maintain consistent time information. An ENB includes the counter value in system information to notify it to UEs so that the UE and the ENB may share the same time information. The UMTS mobile communication system uses, as the system counter, a System Frame Number (SFN) that increases every 10 msec. The LTE system also uses a similar counter, and is assumed herein to use an SFN that increases every 10 msec, like the UMTS system. Frames based on this assumption are illustrated in FIG. 4.

Figure 4:
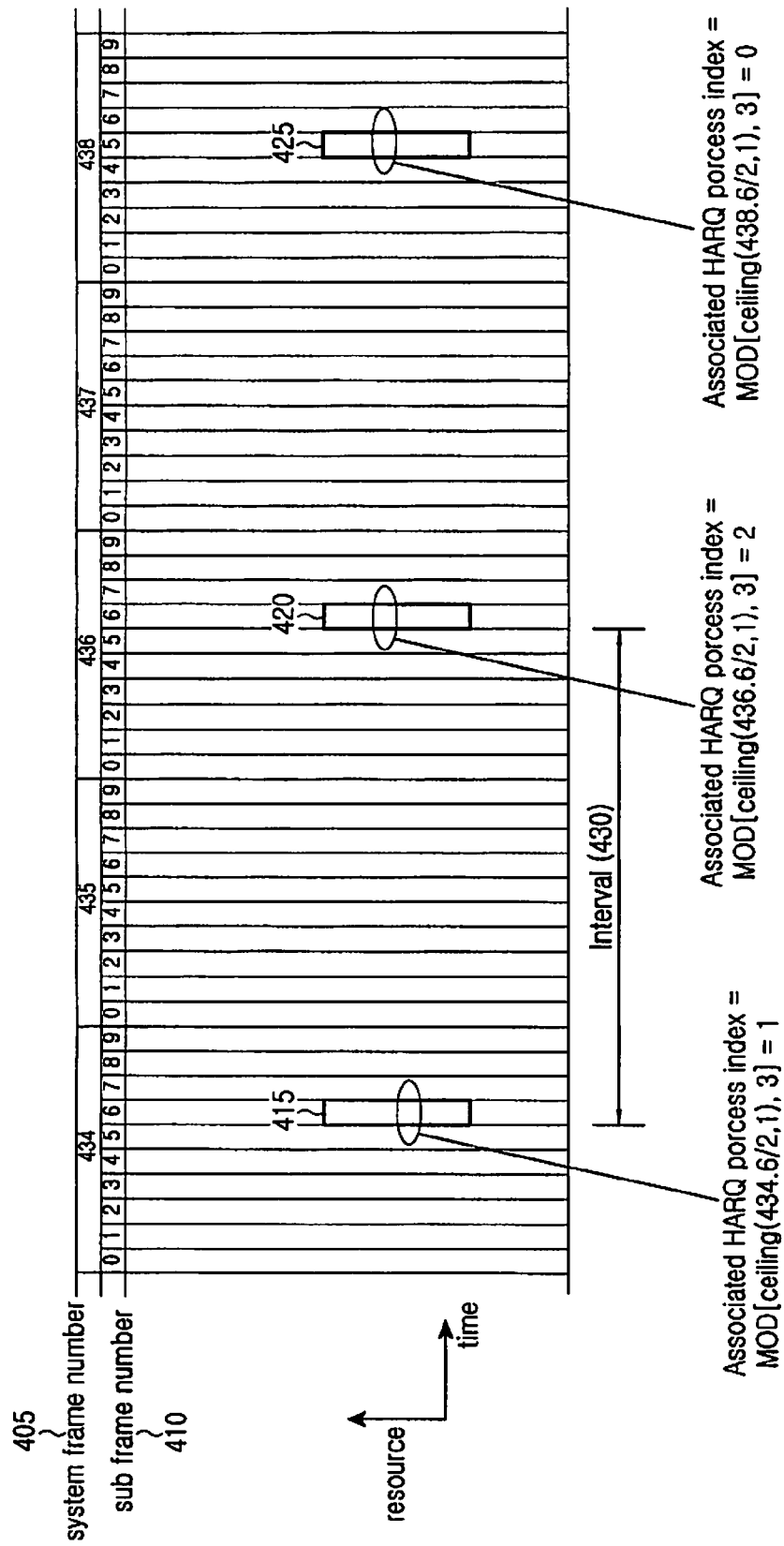
FIG. 4 is a diagram illustrating frames of an LTE system and their SFNs and subframe numbers according to a second embodiment of the present invention.

FIG. 4 is a diagram illustrating frames of the LTE system and their SFNs and subframe numbers on the forgoing assumption according to the present invention.

In FIG. 4, the horizontal axis represents time, and the vertical axis represents resources. Shown on the top of the drawing are SFNs 405 and subframe numbers 410 of #0-#9 for every SFN. In the LTE system, as illustrated in the drawing, the minimum time unit is a subframe with a 1-msec size, 10 subframes constitute one frame, and each frame is assigned an individual SFN. The SFN has a finite size, and if 12-bit SFN is used as in UMTS, the SFN has a value circulating between 0 and 4095. In the LTE system, an arbitrary subframe is identified by the subframe numbers 410 having a value between 0 and 9, and the SFN 405 having a value between 0 and 4095.

The time at which arbitrary persistent resources are allocated can be replaced with an SFN and a subframe number, and a combination of the SFN and the subframe number will be called herein "time information". Time information can be expressed as shown in Equation (1).

$$\text{time information} = \text{SFN} + \text{subframe number} \times 0.1 \quad (1)$$

For example, time information of persistent resource 415 is (434, 6), and time information of persistent resource 420 is (436, 6). Calculating a persistent resource-dedicated HARQ process identifier from the time information of the persistent resources at a particular time is possible by defining a function having, as its inputs, a persistent resource allocation interval 430 and the number of HARQ processes allocated for (or associated with) persistent resources. Therefore, a persistent resource-dedicated HARQ process identifier can be expressed as shown in Equation (2).

$$\text{persistent resource-dedicated HARQ process identifier} = F1(i, n, t) \quad (2)$$

In Equation (2), i denotes a persistent resource allocation interval expressed in units of 10 msec, n denotes the number of persistent resource-dedicated HARQ processes, and t denotes time information of the timing at which persistent resources are allocated.

For example, regarding calculation of an index of the persistent resource-dedicated HARQ process, an index of a HARQ process can be calculated from time information using the method of Equation (3), and an actual identifier of the HARQ process can be determined from the index.

$$\text{persistent resource-dedicated HARQ process's index} = \text{MOD } [s,n], \ s = \text{ceiling}[t/i,1] \quad (3)$$

In Equation (3), i denotes a persistent resource allocation interval expressed in units of 10 msec, n denotes the number of persistent resource-dedicated HARQ processes, and t denotes time information of the timing at which persistent resources are allocated.

The HARQ process index, converted into an integer of the persistent resource-dedicated HARQ process, is information related to a relative sequence of the particular HARQ process in a set of persistent resource-dedicated HARQ processes. For example, if $x_0, x_1, x_2, \ldots, x_n$ are assigned to an arbitrary UE as persistent resource-dedicated HARQ process identifiers, a process index 0 indicates an HARQ process $x_0$, an index 1 indicates an HARQ process $x_1$, an index 2 indicates an HARQ process $x_2$, and an index n indicates an HARQ process $x_n$. A relation between the persistent resource-dedicated HARQ process identifiers and the HARQ process indexes can be notified to the UE through a call setup process.

It is assumed in Equation (3) that one persistent resource is allocated in one interval. That is, Equation (3) is applied when persistent resources are allocated only for HARQ initial transmission. If several persistent resources are allocated in one interval, for example, if persistent resources are allocated so that they can be used for first n HARQ transmissions, t, in Equation (3), denotes time information for the time at which persistent resources used for initial transmission are allocated. If Equation (3) is applied on the assumption that a persistent resource allocation interval is 20 msec and the number of persistent resource-dedicated HARQ processes is 3, a HARQ process index for the first persistent resource 415 is 1, and its associated HARQ process identifier is $x_1$. Further, a HARQ process index for the second persistent resource 420 is 2, and its associated HARQ process identifier is $x_2$. Finally, a HARQ process index for the persistent resource 425 is 0, and its associated HARQ process identifier is $x_0$.

Therefore, if the UE initially receives a HARQ packet through persistent resources, it calculates a HARQ process identifier associated with the HARQ packet using time information for the initial reception timing, and then identifies HARQ retransmission for the HARQ packet using the HARQ process identifier.

Figure 5:
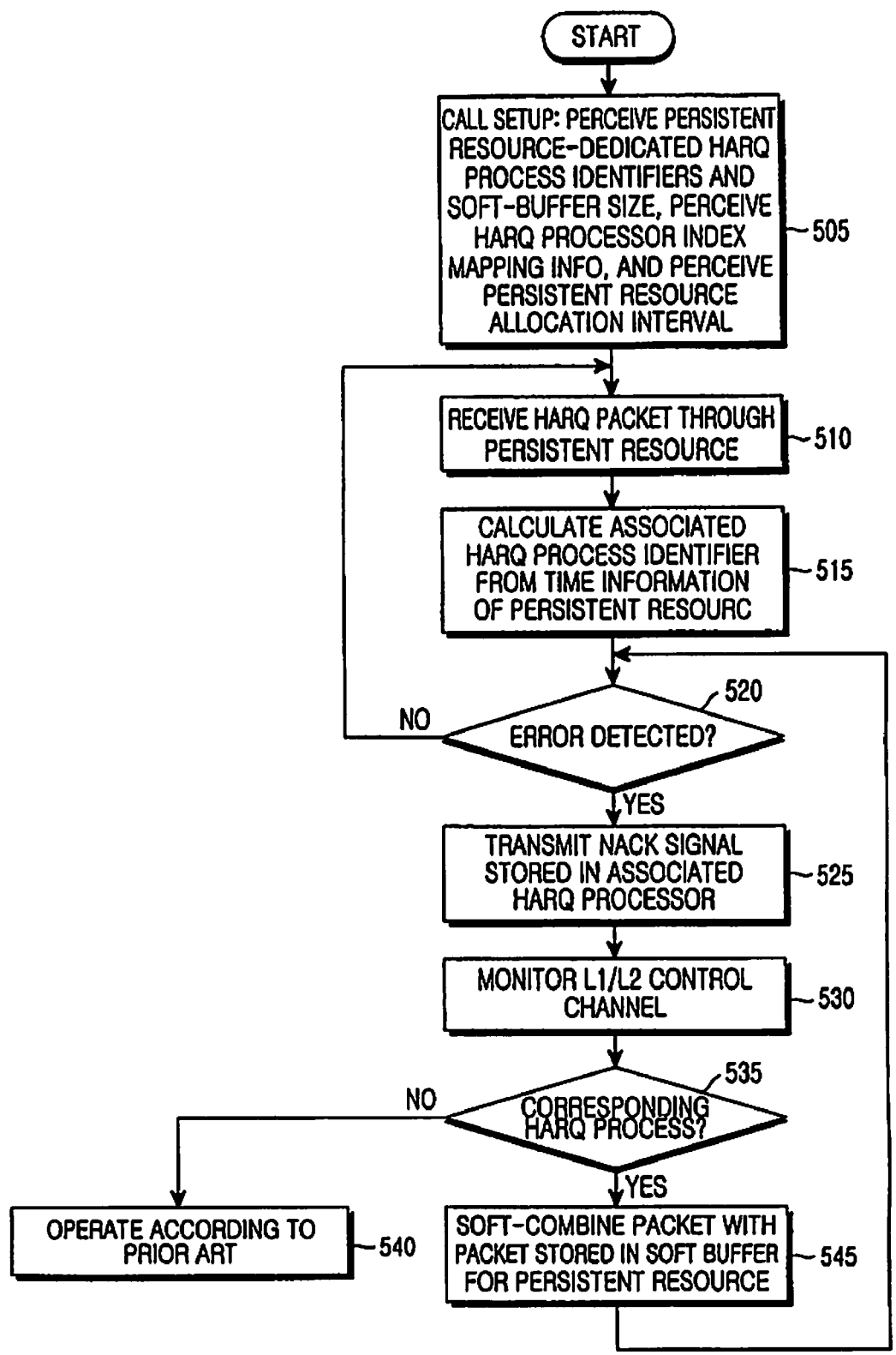
FIG. 5 is a flowchart illustrating an operation of HARQ-receiving data in a UE according to the second embodiment of the present invention.

FIG. 5 is a flowchart illustrating an operation of HARQ-receiving data in a UE according to the second embodiment of the present invention.

Referring to FIG. 5, in step 505, the UE performs call setup. During the call setup, the UE receives information on persistent resource-dedicated HARQ processes identifiers and soft-buffer size. When the number of HARQ processes allocated for persistent resources is defined as n, the UE assigns n soft buffers corresponding to the buffer size for persistent resources. In addition, the UE receives a signaling including mapping information between the persistent resource-dedicated HARQ process identifier indexes and the HARQ process identifiers in the call setup process. In short, when n processes $x_0, x_1, x_2, \ldots, x_{n-1}$ are allocated for persistent resources, the UE perceives the relation between the HARQ process identifier indexes and the actual HARQ process identifiers based on the mapping information. For example, when HARQ process 1, HARQ process 3, and HARQ process 7 are allocated for persistent resources, the mapping information between the persistent resource-dedicated HARQ process identifier indexes and the HARQ process identifiers can be expressed as shown in Equation (4).

HARQ process 1=HARQ process identifier index 0

HARQ process 3=HARQ process identifier index 1

HARQ process 7=HARQ process identifier index 2 (4)

The UE receives a signaling indicating a persistent resource allocation interval in the call setup process. For ease of explanation, the persistent resource allocation interval expressed in units of frames will be referred to herein as "i". If the persistent resource allocation interval is 20 msec, i is set to 2 (i=2).

After persistent resources are allocated to the UE at an arbitrary time, the UE receives, in step 510, a HARQ packet through persistent resources that periodically come. Upon receiving the HARQ packet through persistent resources, in step 515, the UE calculates a HARQ process index to be applied to the HARQ packet received through persistent resources using Equation (3), and checks a HARQ process identifier indicated by the index. Further, the UE maps the HARQ packet received through persistent resources to the HARQ process identifier. Thereafter, the UE performs CRC calculation on the HARQ packet received through persistent resources in step 520 to check if there is an error in the HARQ packet.

If there is no error, the UE delivers the HARQ packet to an upper layer, and then waits until an HARQ packet is received through the next persistent resources in step 510.

However, if there is an error, in step 525, the UE stores the packet received through persistent resources in the HARQ process corresponding to the HARQ process identifier calculated in step 515, and transmits a negative response signal NACK through a response channel. Thereafter, in step 530, the UE monitors an L1/L2 control channel to receive HARQ retransmission. Upon detecting a HARQ packet scheduled thereto, in step 535, the UE checks if the HARQ process identifier of the HARQ packet corresponds to the persistent resource-dedicated HARQ process calculated in step 515. If the HARQ process identifier of the HARQ packet corresponds to the persistent resource-dedicated HARQ process, the UE proceeds to step 545, and otherwise, proceeds to step 540.

In step 540, the UE performs a predetermined necessary operation according to the prior art. That is, the UE determines a HARQ process, a packet stored in which it will soft-combine with the received HARQ packet depending on the HARQ process identifier of the received HARQ packet, checking presence/absence of an error therein, and transmitting HARQ feedback information according to the check result. However, in step 545, the UE soft-combines the received HARQ packet with the data stored in the corresponding persistent resource-dedicated HARQ process. Thereafter, the UE returns to step 520 where it performs an error detection operation. The UE then repeats the HARQ operation until a predetermined condition is satisfied.

Third Embodiment

The third embodiment of the present invention maps an arbitrary HARQ process identifier to a HARQ process where data to be subject to soft-combining is stored, using a relative allocation sequence of persistent resources from the timing at which a persistent resource-dedicated HARQ process identifier is received through an L1/L2 control channel. An ENB and a UE agree to use n HARQ processes for persistent resources, and assign not the absolute identifiers, but relative identifiers to the persistent resource-dedicated HARQ processes. For example, the relative identifier indicates what previous interval, a HARQ packet transmitted though persistent resources in which should be soft-combined with the retransmission HARQ packet.

More specifically, the UE and the ENB agree on the meanings of the persistent resource-dedicated HARQ process identifiers and the HARQ process identifiers in the call setup process, as follows. The agreement is previously made so that a HARQ process $x_0$ used for persistent resources indicates a HARQ process in which a HARQ packet received through persistent resources allocated in the just previous interval is stored; a HARQ process $x_1$ means an HARQ process in which an HARQ packet received through persistent resources allocated in the second previous interval is stored; and a HARQ process $x_2$ means a HARQ process in which an HARQ packet received through persistent resources allocated in a third previous interval is stored.

Figure 6:
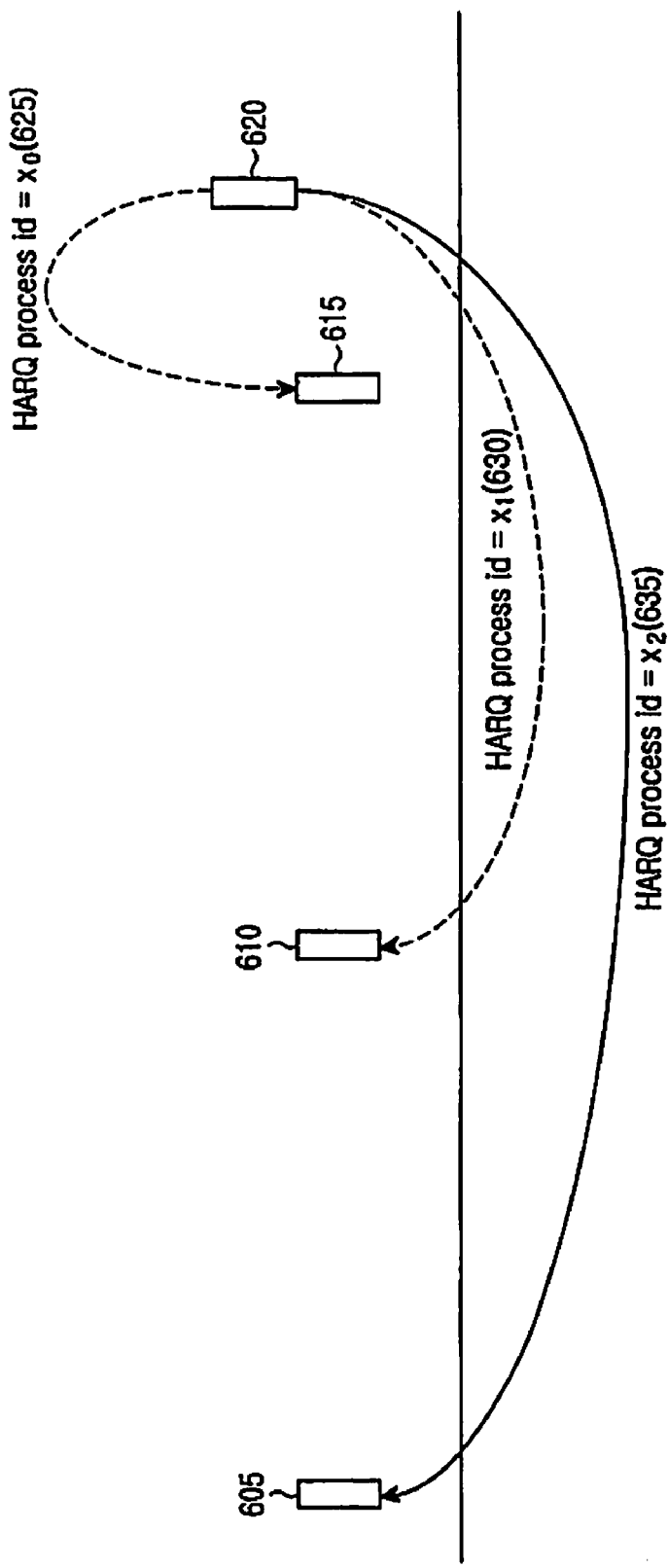
FIG. 6 is a diagram illustrating a procedure for HARQ-processing persistent resources according to a third embodiment of the present invention.

FIG. 6 is a diagram illustrating a procedure for HARQ-processing persistent resources according to the third embodiment of the present invention.

Referring to FIG. 6, if a UE initially receives an HARQ packet through persistent resource, the UE stores the HARQ packet in an arbitrary HARQ process where no data is stored, among the HARQ processes allocated for persistent resources. Thereafter, the UE can receive retransmission of the HARQ packet at an arbitrary time as illustrated by reference numeral 620. Then the UE checks a HARQ process identifier of the HARQ packet. If the HARQ identifier is $x_0$ (625), the UE delivers the retransmission HARQ packet to an HARQ process in which an HARQ packet 615 received through the just previous persistent resource is stored. That is, the UE soft-combines the HARQ packet 620 transmitted along with the HARQ process identifier $x_0$ with the data stored in the HARQ process in which the HARQ packet 615 received through the just previous persistent resource is stored.

If the HARQ identifier is $x_1$ (630), the UE identifies that the HARQ identifier indicates a HARQ process in which a HARQ packet 610 received through the second previous persistent resource is stored. Then the UE soft-combines the HARQ packet 620 with the data stored in the HARQ process. If the HARQ identifier is $x_2$ (635), the UE identifies that the HARQ identifier indicates a HARQ process in which a HARQ packet 605 received through the third previous persistent resource is stored. Then the UE soft-combines the HARQ packet 620 with the HARQ packet stored in the HARQ process.

Figure 7:
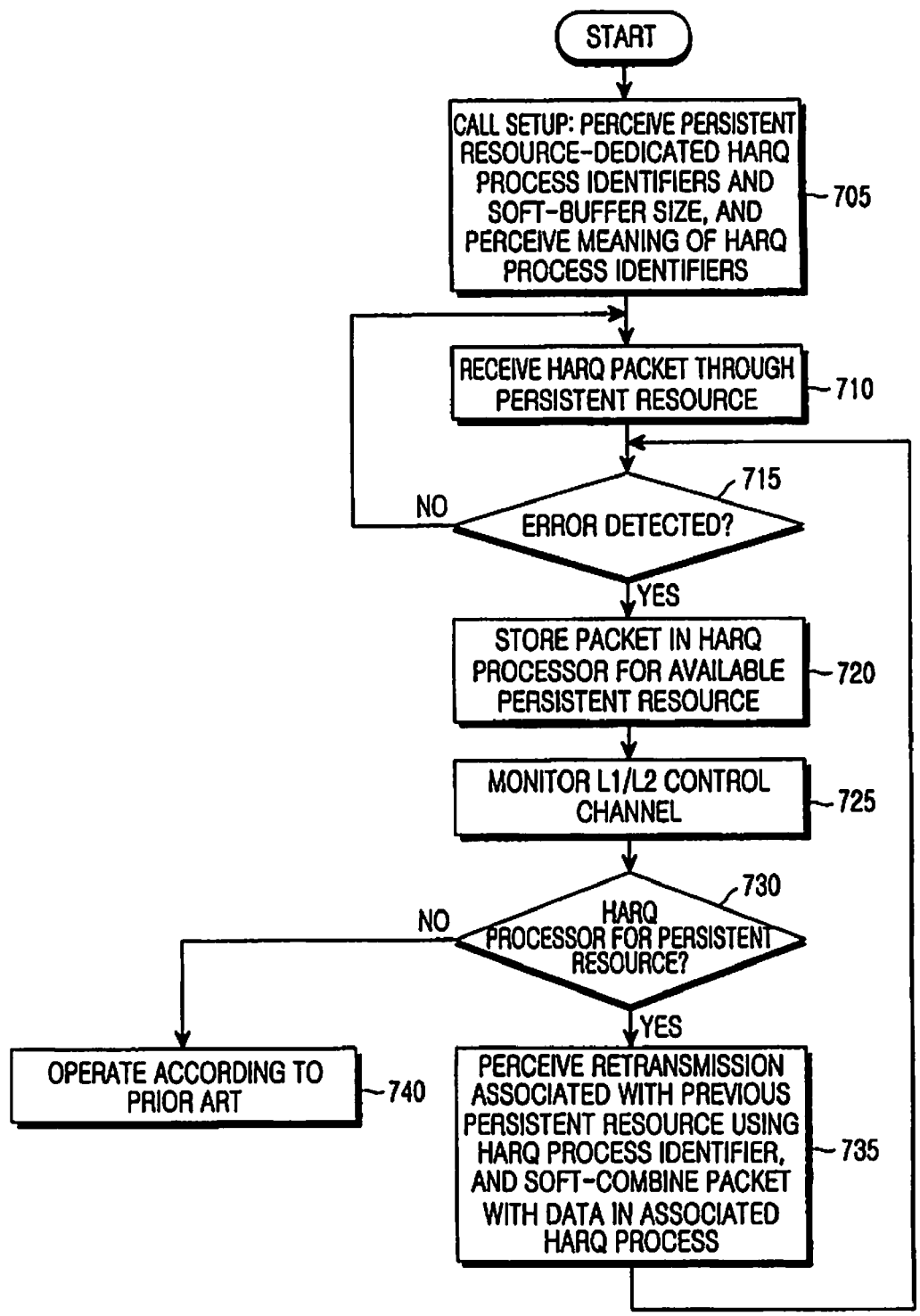
FIG. 7 is a flowchart illustrating an operation of receiving a HARQ packet in a UE according to the third embodiment of the present invention.

FIG. 7 is a flowchart illustrating an operation for receiving a HARQ packet in a UE according to the third embodiment of the present invention.

Referring to FIG. 7, in a call setup process of step 705, the UE receives a signal including persistent resource-dedicated HARQ processes identifiers and soft-buffer size. When the number of HARQ processes allocated for persistent resources is defined as n, the UE allocates n soft buffers corresponding to the buffer size for persistent resources. The UE receives a signal indicating the meaning of the persistent resource-dedicated HARQ process identifier in the call setup process. That is, the UE receives a signaling including information indicating what previous persistent resource, an identifier of a process associated with which a particular HARQ process identifier corresponds to. The UE identifies n processes $x_0$, $x_1$, $x_2$, ..., $x_{n-1}$ as persistent resource-dedicated HARQ process identifiers, and the meaning of each HARQ process identifier is defined as Equation (5).

HARQ process $x_0$=process identifier associated with just previous persistent resource HARQ process $x_1$=process identifier associated with second previous persistent resource HARQ process $x_2$=process identifier associated with third previous persistent resource HARQ process $x_{n-1}$=process identifier associated with $n^{th}$ previous persistent resource        (5)

If the UE, which has completed the call setup process, is allocated persistent resources at an arbitrary time, the UE receives a HARQ packet through the persistent resources in step 710. Thereafter, the UE performs CRC calculation on the HARQ packet received through the persistent resource in step 715 to check if there is an error in the HARQ packet. If there is no error, the UE delivers the HARQ packet to an upper layer, and then waits until an HARQ packet is received through the next persistent resources in step 710.

However, if there is an error, in step 720, the UE stores the HARQ packet including the error as it is received through the persistent resources, in one of the currently unused persistent resource-dedicated HARQ processes in which no data is stored, and then transmits a NACK signal. Thereafter, in step 725, the UE monitors an L1/L2 control channel to receive HARQ retransmission. If the UE receives a HARQ packet scheduled thereto while monitoring the L1/L2 control channel, the UE checks in step 730 if a HARQ process identifier of the HARQ packet corresponds to any one of the persistent resource-dedicated HARQ processes calculated in step 715. If the HARQ process identifier of the received HARQ packet corresponds to any one of the persistent resource-dedicated HARQ processes, the UE proceeds to step 735, and otherwise, proceeds to step 740.

In step 740, the UE performs a predetermined operation according to the prior art. That is, the UE performs an operation of soft-combining the received HARQ packet with the packet stored in the HARQ process indicated by an HARQ process identifier of the HARQ packet, checking presence/absence of an error therein, and transmitting HARQ feedback information.

However, in step 735, the UE checks the process, a packet associated with which corresponds to the HARQ packet, depending on the HARQ process identifier of the received HARQ packet. That is, if the HARQ process identifier is $x_m$, the UE identifies that the process identifier indicates a process associated with the $m^{th}$ previous persistent resource. Therefore, the UE soft-combines the received HARQ packet with the data stored in the process in which the HARQ packet received through the $m^{th}$ previous persistent resource was stored. Thereafter, the UE returns to step 715 where it performs an error detection operation. The UE repeats the HARQ operation until a predetermined condition is satisfied.

Figure 8:
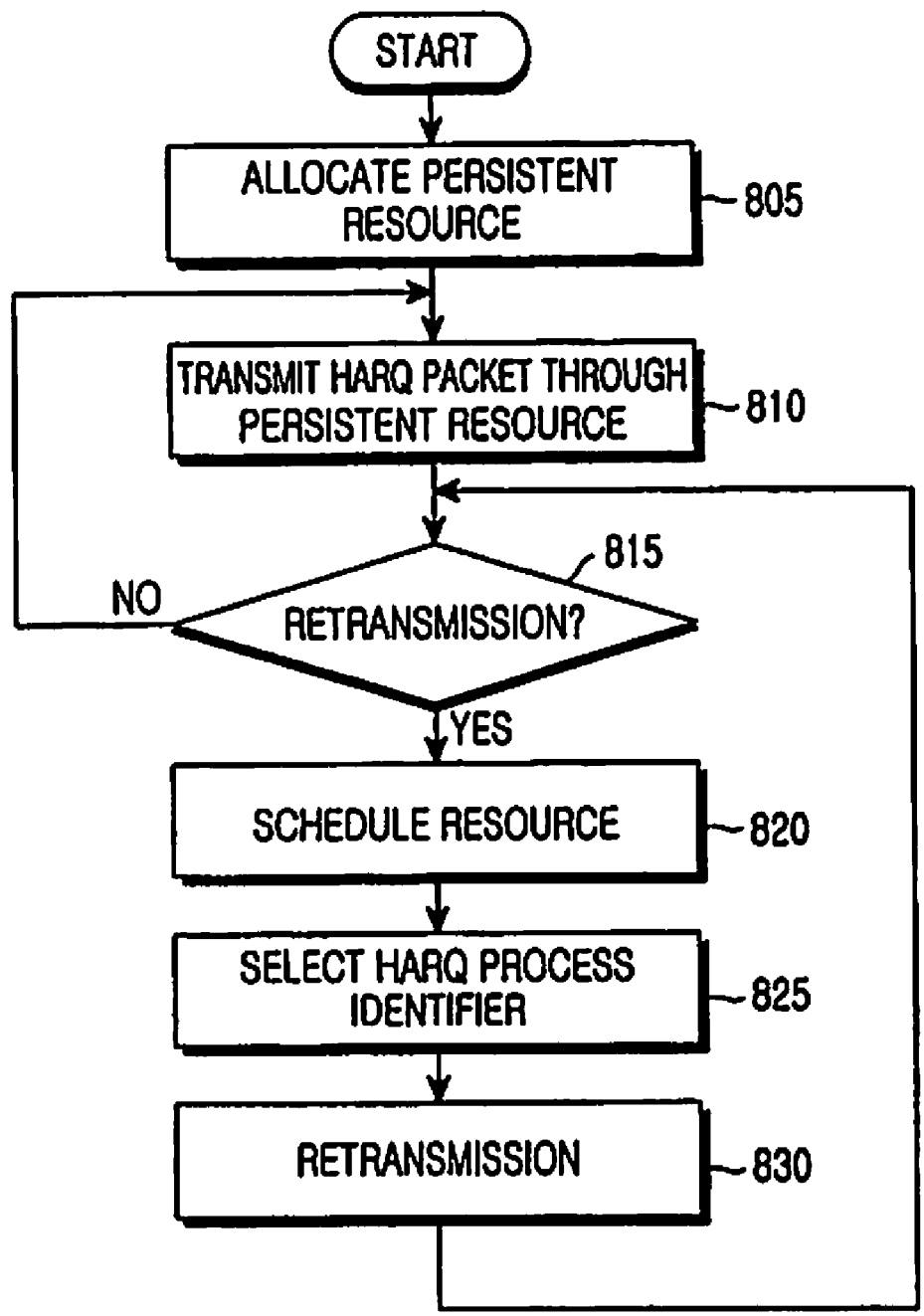
FIG. 8 is a flowchart illustrating an operation of transmitting a HARQ packet through persistent resources in an ENB according to the present invention.

FIG. 8 is a flowchart illustrating an operation for transmitting a HARQ packet through persistent resources in an ENB according to the present invention.

Referring to FIG. 8, in step 805, the ENB allocates persistent resources to a UE to which it should allocate persistent resources, such as VoIP. Thereafter, in step 810, the ENB transmits a HARQ packet to the UE using the persistent resources. In step 815, the ENB determines whether to perform retransmission based on a HARQ feedback received from the UE. That is, the ENB checks a response channel from the UE to determine whether it has received a NACK signal (NACK) or an Acknowledge signal (ACK). If it has received an ACK signal, the ENB transmits an HARQ packet through persistent resources at the next timing in step 810.

However, if the ENB has received a NACK signal, in step 820, the ENB performs a predetermined scheduling algorithm to determine transmission resources for HARQ retransmission. Thereafter, in step 825, the ENB determines an identifier of a HARQ process to be used for retransmission. When the above-described first embodiment is applied, the ENB uses the persistent resource-dedicated HARQ process identifier agreed upon with the UE in the call setup process, for the retransmission. When the second embodiment is applied, the ENB uses, for the retransmission, a HARQ process identifier derived from time information of the timing at which an HARQ packet is transmitted through persistent resources, among the persistent resource-dedicated HARQ process identifiers agreed upon with the UE in the call setup process. When the third embodiment is applied, the ENB selects a proper HARQ process identifier depending on a time difference between the timing at which a retransmission packet is transmitted and the time at which a HARQ packet is transmitted through persistent resources, among the persistent resource-dedicated HARQ process identifiers agreed upon with the UE in the call setup process. In step 830, the ENB retransmits an HARQ packet using the allocated transmission resources and the selected HARQ process identifier. Thereafter, in step 815, the ENB checks if there is a need for another retransmission.

Figure 9:
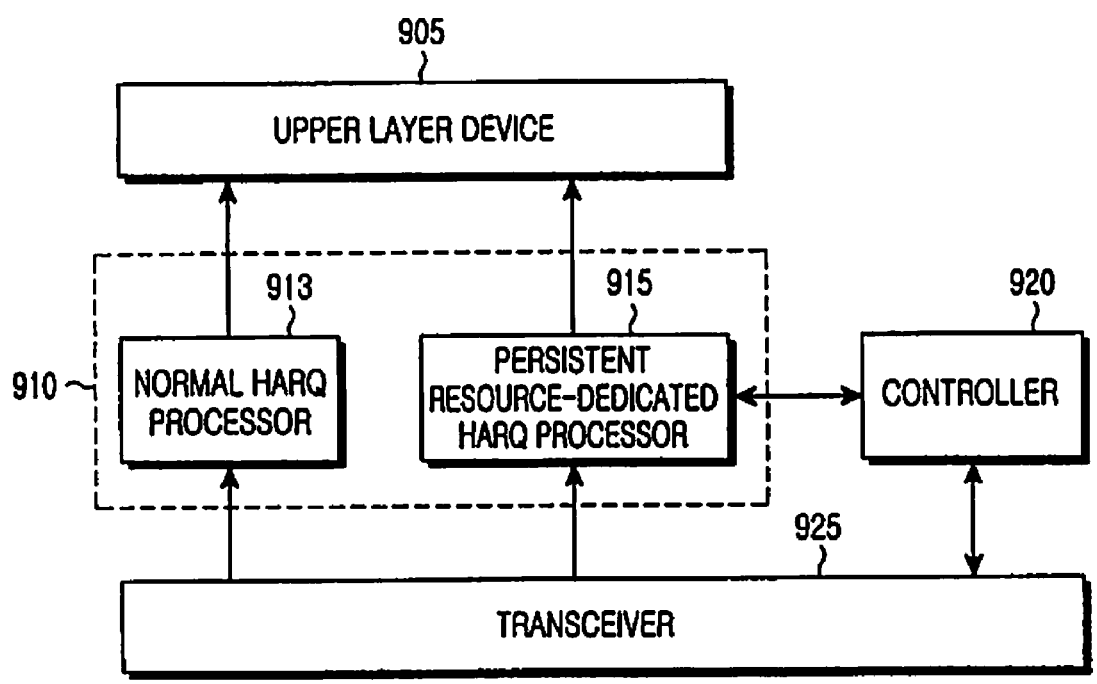
FIG. 9 is a block diagram illustrating an internal structure of a UE apparatus to which the present invention is applied.

FIG. 9 is a block diagram illustrating an internal structure of a UE apparatus to which the present invention is applied. It should be noted in FIG. 9 that only the elements essential to the present invention are shown and other elements irrelevant to the present invention are not shown for simplicity.

Referring to FIG. 9, the UE apparatus includes an upper layer device 905, a HARQ process 910, in which a normal HARQ processor 913 and a persistent resource-dedicated HARQ processor 915 are included, a transceiver 925, and a controller 920. For each of the HARQ processors 913 and 915, at least one processor is provided in association with the service.

The controller 920 receives L1/L2 control information via the transceiver 925, and receives a HARQ packet using transmission resources identified through the received L1/L2 control information. Further, the controller 920 determines to which HARQ process it will deliver the received HARQ packet. The controller 920, when it receives a HARQ packet through persistent resources, stores it in a HARQ process allocated for persistent resources. That is, the controller 920 determines on which packet the corresponding retransmission is made, for the HARQ packet received through persistent resources, depending on the HARQ process identifier acquired through an L1/L2 control channel, and controls the transceiver 925 so that the retransmitted HARQ packet is delivered to a proper HARQ process. In other words, the controller 920 controls the transceiver 925 so that it receives a retransmission packet having a persistent resource-dedicated HARQ process identifier agreed upon in the call setup process according to the first embodiment.

Further, the controller 920 controls the transceiver 925 so that it receives a retransmission packet by checking a HARQ process identifier derived from time information of the timing at which a HARQ packet is transmitted through persistent resources using the information acquired in the call setup process according to the second embodiment.

In addition, the controller 920 controls the transceiver 925 to select a HARQ process identifier depending on a time difference between the time at which a retransmission packet is transmitted and the time at which an HARQ packet is transmitted through persistent resources according to the third embodiment, and receives a retransmission packet having the selected identifier.

Moreover, according to the fourth embodiment, the controller 920 detects an identifier through a relation with the persistent resource allocation timing, using a Retransmission Sequence Number (RSN) signaled from an ENB, and selects a HARQ process associated with the corresponding identifier.

The transceiver 925 receives L1/L2 control information or a HARQ packet through a wireless channel. Generally, the transceiver 925 can include a Radio Frequency (RF) unit, an antenna, and a modem.

The HARQ process 910 includes soft buffers provided for performing a HARQ operation, and is identified by a HARQ process identifier. Therefore, the HARQ process 910 can be implemented with a memory. The persistent resource-dedicated HARQ processor 915 stores therein the HARQ packet associated with persistent resources.

The upper layer device 905 is for receiving the packet successfully received in the HARQ process, and performing a predetermined operation thereon.

Figure 10:
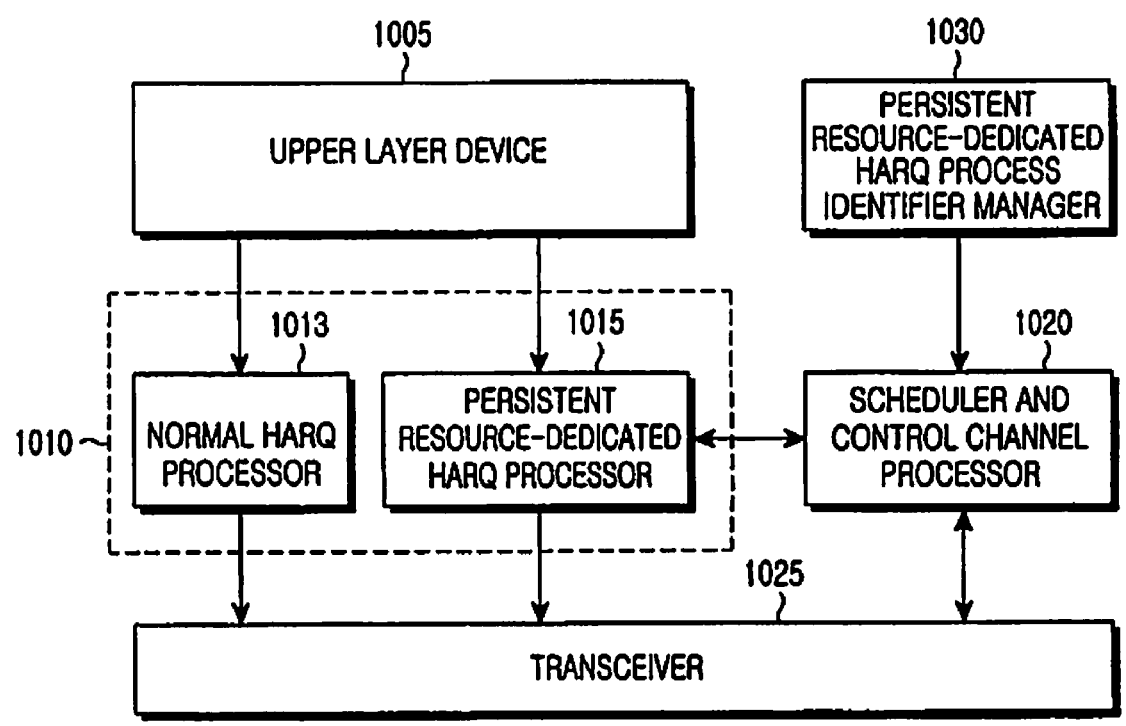
FIG. 10 is a block diagram illustrating an internal structure of an ENB apparatus according to the present invention.
Figure 11:
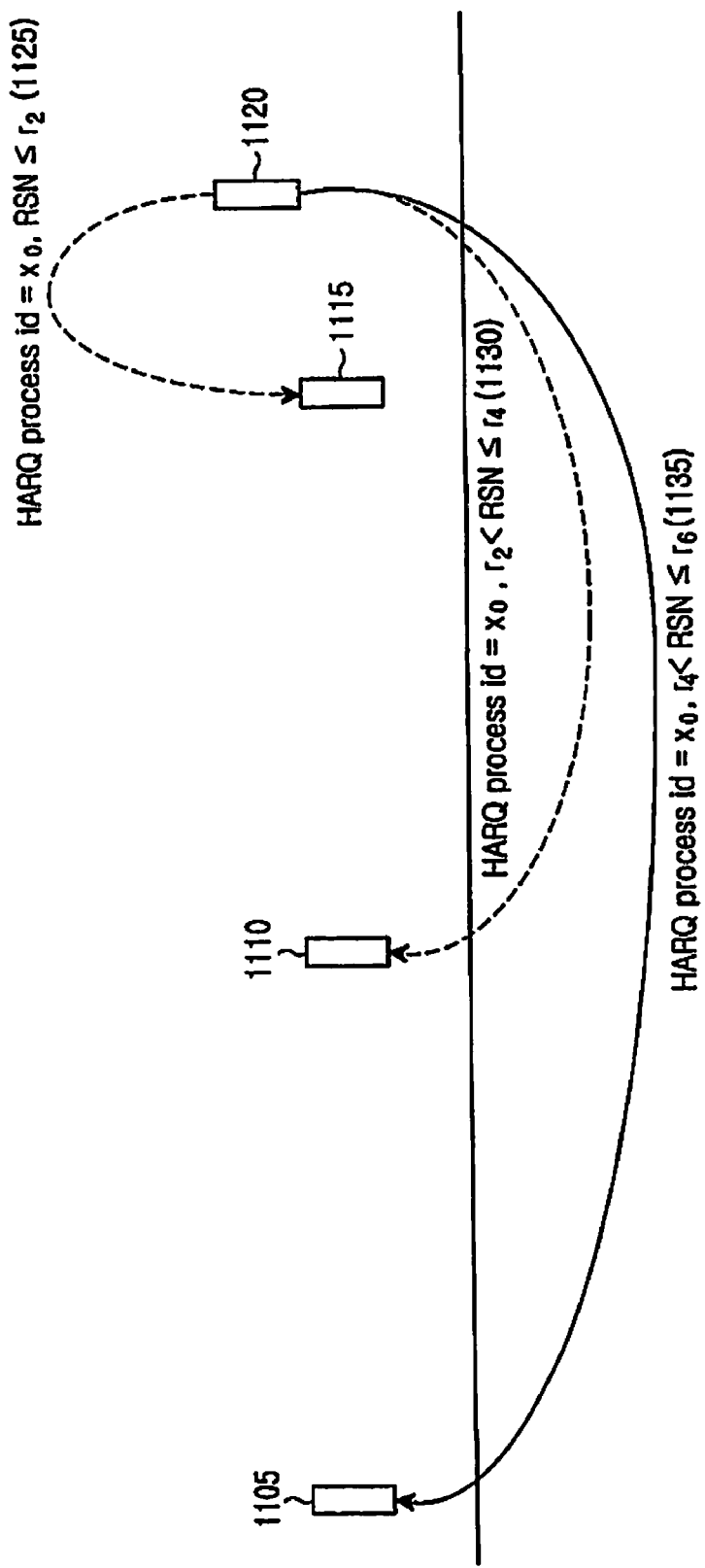
FIG. 11 is a diagram illustrating a procedure for HARQ-processing persistent resource according to a fourth embodiment of the present invention.

FIG. 10 is a block diagram illustrating an internal structure of an ENB apparatus according to the present invention.

Referring to FIG. 10, the ENB apparatus includes an upper layer device 1005, a HARQ layer device (or HARQ process) 1010 in which a normal HARQ processor 1013 and a persistent resource-dedicated HARQ processor 1015 are included, a transceiver 1025, a scheduler and control channel processor 1020, and a persistent resource-dedicated HARQ process identifier manager 1030.

The scheduler and control channel processor 1020 allocates transmission resources to a UE through a predetermined scheduling operation, generates L1/L2 control information, and transmits it to the UE. The scheduler and control channel processor 1020 receives an HARQ process identifier notified from the persistent resource-dedicated HARQ process identifier manager 1030 during retransmission on a HARQ packet to be transmitted through persistent resources.

The persistent resource-dedicated HARQ process identifier manager 1030 manages identifiers of HARQ processes allocated for persistent resources. The persistent resource-dedicated HARQ process identifier manager 1030, before execution of retransmission on the HARQ packet to be transmitted through persistent resource, selects a persistent resource-dedicated HARQ process identifier to be used, and notifies it to the scheduler and control channel processor 1020. That is, the persistent resource-dedicated HARQ process identifier manager 1030 uses, for the retransmission, a persistent resource-dedicated HARQ process identifier agreed upon in the call setup process according to the first embodiment of the present invention.

When the second embodiment is applied, the persistent resource-dedicated HARQ process identifier manager 1030 uses, for the retransmission, a HARQ process identifier derived from time information of the timing at which a HARQ packet is transmitted through persistent resources, among the persistent resource-dedicated HARQ process identifiers agreed upon in the call setup process.

When the third embodiment is applied, the ENB selects a proper HARQ process identifier among the persistent resource-dedicated HARQ process identifiers agreed upon with the UE in the call setup process, depending on a time difference between the timing at which a retransmission packet is transmitted and the timing at which a HARQ packet is transmitted through persistent resources.

In the fourth embodiment, the persistent resource-dedicated HARQ process identifier manager 1030 selects an identifier using RSN based on a relation with the persistent resource allocation timing.

The transceiver 1025 is a device for transmitting L1/L2 control information or a HARQ packet through a wireless channel. The transceiver 1025 can include an antenna, an RF unit, and a modem. The HARQ process 1010 includes soft buffers provided for performing a HARQ operation, and can be implemented with a memory. The soft buffers are identified by HARQ process identifiers. The persistent resource-dedicated HARQ processor 1015 processes only the HARQ packet associated with persistent resources.

The upper layer device 1005 is for receiving a packet successfully received in the HARQ process 1010, and performing a predetermined operation thereon.

Fourth Embodiment

The fourth embodiment of the present invention provides a method for identifying a HARQ process in which a packet to be subject to soft-combining is stored, using other information rather than the HARQ process identifier. The fourth embodiment of the present invention indicates a HARQ process identifier using the soft-combining-related information like the RSN.

RSN is information indicating the sequence of HARQ retransmission. The fourth embodiment of the present invention restricts an RSN range available for a predetermined interval, thereby determining one of several HARQ processes, data stored in which should be soft-combined with the received data, using an RSN value of the received data. For example, in a system where 8 RSN code points $r_1$-$r_8$ are defined, an RSN for retransmission of an HARQ packet received through persistent resources at an arbitrary liming is determined according to the rule defined as shown in Equation (6).

$RSN=r_1,r_2$ which can be used until the timing at
which the first persistent resource is allocated
after persistent resources $RSN=r_3,r_4$ which can be used until the timing at
which the second persistent resource is allocated
after persistent resources $RSN=r_5,r_6$ which can be used until the timing at
which the third persistent resource is allocated
after persistent resources $RSN=r_7,r_8$ which can be used until the timing at
which the fourth persistent resource is allocated
after persistent resources       (6)

Upon successfully in decoding an L1/L2 control channel at an arbitrary timing, the UE checks a HARQ process identifier in the L1/L2 control channel, and if the HARQ process identifier indicates retransmission for the data received through persistent resources, the UE checks an RSN of the L1/L2 control channel. If the RSN is $r_1$ or $r_2$ (1125), because the data indicates retransmission for the data 1115 received through persistent resources at the nearest persistent resource allocation timing, the UE soft-combines it with the data 1115 received through the nearest persistent resources. If the RSN is $r_3$ or $r_4$ (1130), because the data indicates retransmission for the data 1110 received through persistent resources at the second previous persistent resource allocation timing from the current timing, the UE soft-combines it with the data 1110 received through the second previous persistent resource from the current one. If the RSN is $r_5$ or $r_6$ (1135), because the data indicates retransmission for the data 1105 received through persistent resources at the third previous persistent resource allocation timing from the current timing, the UE soft-combines it with the data 1105 received through the third previous persistent resource allocation timing from the current timing.

Figure 12:
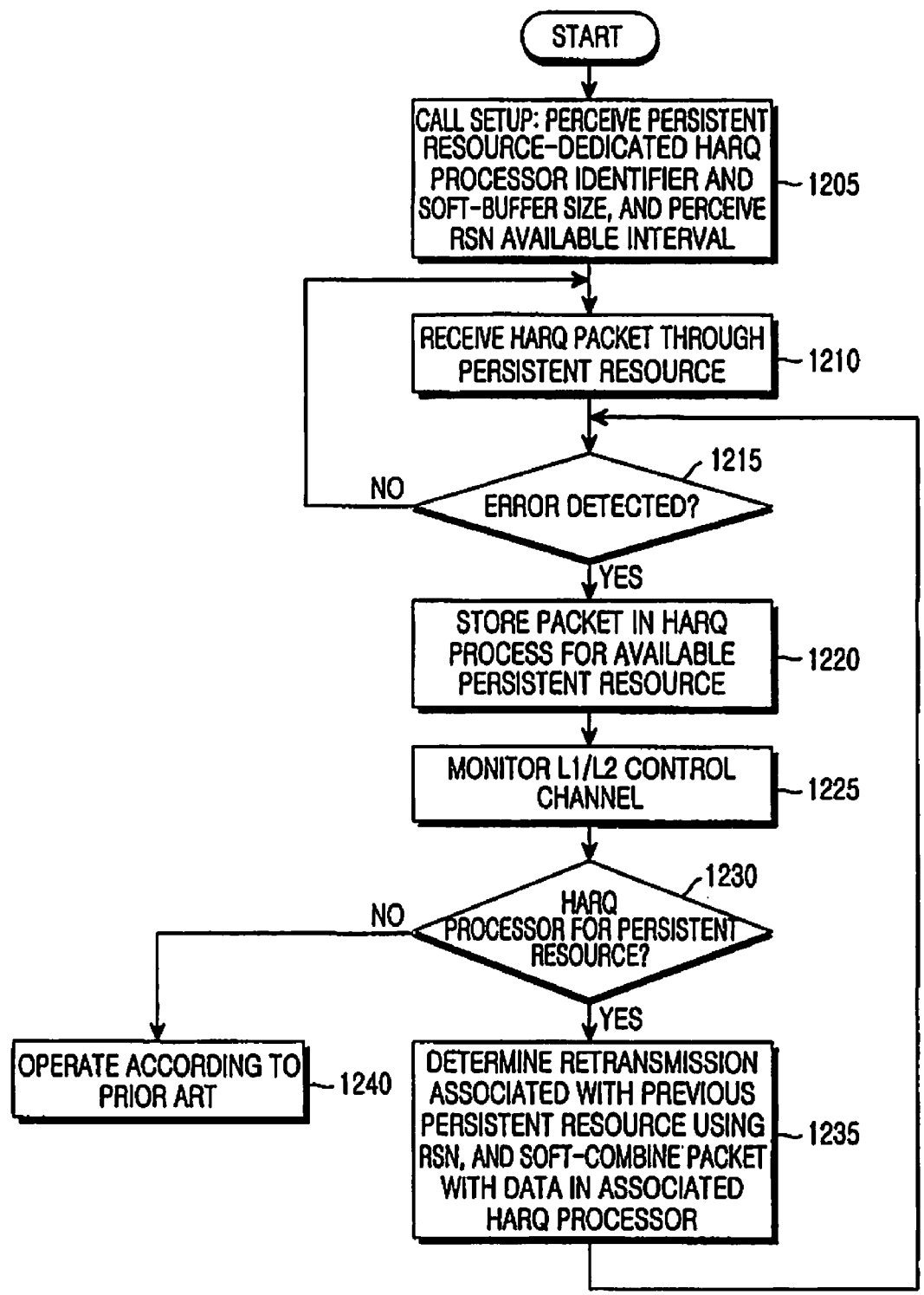
FIG. 12 is a flowchart illustrating an operation of receiving a HARQ packet in a UE according to the fourth embodiment of the present invention.

FIG. 12 is a flowchart illustrating an operation of receiving a HARQ packet in a UE according to the fourth embodiment of the present invention.

Referring to FIG. 12, in the call setup process of step 1205, the UE receives a signaling including a HARQ process identifier indicating a persistent resource-dedicated HARQ process, the number and soft-buffer size of persistent resource-dedicated HARQ processes, and an available interval of RSN. More specifically, when the number of HARQ processes allocated for persistent resources is defined as n, the UE allocates n soft buffers corresponding to the buffer size for persistent resources.

In addition, the UE receives a signaling including an identifier of a persistent resource-dedicated HARQ process in the call setup process. The number of the identifiers is always one, regardless of the number of HARQ processes allocated for persistent resources, and the persistent resource-dedicated HARQ process identifier only indicates that the data received at an arbitrary timing is retransmission for the data received through persistent resources, and RSN/retransmission mapping information indicates the HARQ process, retransmission for the data stored in which the received data corresponds to.

The UE receives a signaling including information by which it can identify a persistent resource-dedicated HARQ process, i.e., the information on a relation between the RSN and the persistent resource allocation timing, in the call setup process. This information indicates what previous persistent resource allocation timing, retransmission for a packet received through persistent resources in which an arbitrary RSN x is used for. This information is will be referred to herein as RSN/retransmission mapping information. In this case, when there are n RSNs of $r_1$ to $r_n$, the RSN/retransmission mapping information can be generated as defined in Equation (7).

$r_1$: It is used for retransmission on a packet received
through persistent resources at the just previous
persistent resource allocation timing $r_m$: It is used for retransmission on a packet received
through persistent resources at the $x^{th}$ previous
persistent resource allocation timing $r_n$: It is used for retransmission on a packet received
through persistent resources at the $y^{th}$ previous
persistent resource allocation timing       (7)

The details of Equation (7) will be described by way of example. Assuming there are 4 RSNs, 0 to 3, the RSN/retransmission mapping information can be generated as defined below.

0: It is used for retransmission on a packet received through persistent resources at the just previous persistent resource allocation timing.

1: It is used for retransmission on a packet received through persistent resources at the just previous persistent resource allocation timing.

2: It is used for retransmission on a packet received through persistent resources at the second previous persistent resource allocation timing.

3: It is used for retransmission on a packet received through persistent resources at the third previous persistent resource allocation timing.

If the UE, which has completed the call setup process, is allocated persistent resources at an arbitrary timing, the UE receives an HARQ packet through the persistent resources in step 1210. Thereafter, the UE performs CRC calculation on the HARQ packet received through persistent resources in step 1215 to check if there is an error in the HARQ packet. If there is no error, the UE delivers the HARQ packet to an upper layer, and waits until an HARQ packet is received through the next persistent resources in step 1210.

If there is an error, in step 1220, the UE receives the HARQ packet through persistent resources, and stores the HARQ packet having an error in one of the currently unused persistent resource-dedicated HARQ processes in which no other data is stored, and then transmits a NACK signal. Thereafter, in step 1225, the UE monitors an L1/L2 control channel to receive HARQ retransmission.

Upon receiving an HARQ packet scheduled thereto, while monitoring the L1/L2 control channel, in step 1230, the UE checks if a HARQ process identifier of the HARQ packet corresponds to the persistent resource-dedicated HARQ process identifier perceived in the call setup process. If the HARQ process identifier of the received HARQ packet indicates the fact that the HARQ packet is retransmission for a HARQ packet received through persistent resources, the UE proceeds to step 1235, and otherwise, proceeds to step 1240.

In step 1240, the UE performs a predetermined operation according to the prior art. That is, the UE performs an operation of soft-combining the received HARQ packet with the packet stored in the HARQ process indicated by the HARQ process identifier of the packet, checking presence/absence of an error therein, and transmitting HARQ feedback information.

However, in step 1235, the UE checks the process, a packet associated with which the HARQ packet corresponds to, depending on the RSN of the received HARQ packet. That is, if RSN is an arbitrary k, the UE checks what previous persistent resource allocation timing, retransmission on a packet received through persistent resources in which is indicated by the k, depending on the RSN/retransmission mapping information, and soft-combines the packet with the received HARQ packet. Thereafter, in step 1215, the UE performs an error detection operation. The UE repeats the HARQ operation until a predetermined condition is satisfied.

As is apparent from the foregoing description, the application of the present invention identifies a packet HARQ-retransmitted through persistent resources. Further, the present invention provides HARQ soft-combining by mapping the packet received through persistent resources to the retransmitted HARQ packet. When there are several HARQ packets received through persistent resources at an arbitrary time, a corresponding processor performs correct soft-combining by determining with which packet an arbitrary retransmission packet should be combined. Therefore, the present invention can prevent the communication failure or unnecessary retransmission caused by the packet perception error. In addition, the present invention can use persistent resource-based HARQ without increasing complexity of the receiver.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting and receiving data in a mobile communication system supporting Hybrid Automatic Repeat reQuest (HARQ), the method comprising:

receiving a HARQ process information and a persistent resource allocation interval information;

receiving data through a resource allocated according to the persistent resource allocation interval information;

calculating a HARQ process identifier (ID) using the HARQ process information, the persistent resource allocation interval information and a time information; and delivering the received data to a HARQ process corresponding to the calculated HARQ process ID, wherein the HARQ process ID is calculated by the following equation, HARQ process ID=s modulo n where the s is an integer derived from t/i, wherein the t is the time information, the i is the persistent resource allocation interval information, and the n is the HARQ process information.

2. The method of claim 1, wherein the HARQ process information comprises a number of HARQ processes for the persistent resource allocation.

3. The method of claim 1, wherein the time information is determined by a System Frame Number (SFN) and sub-frame number.

4. The method of claim 1, further comprising:

determining whether there is a transmission of L1/L2 control information for the data;

if there is no transmission of L1/L2 control information, receiving data through a resource allocated according to the persistent resource allocation interval information, calculating the HARQ process ID using the HARQ process information, the persistent resource allocation interval information and a time information and delivering the received data to a HARQ process corresponding to the calculated HARQ process ID;

if there is a transmission of L1/L2 control information, receiving data according to the L1/L2 control information; and delivering the received data to a HARQ process corresponding to the L1/L2 control information.

5. A method for transmitting and receiving data in a mobile communication system supporting Hybrid Automatic Repeat reQuest (HARQ), the method comprising:

transmitting a HARQ process information and a persistent resource allocation interval information; and transmitting data through a resource allocated according to the persistent resource allocation interval information, wherein a HARQ process identifier (ID) of the data is determined by the HARQ process information, the persistent resource allocation interval information and a time information, wherein the HARQ process ID is calculated by the following equation, HARQ process ID=s modulo n where the s is an integer derived from t/i, wherein the t is the time information, the i is the persistent resource allocation interval information, and the n is the HARQ process information.

6. The method of claim 5, wherein the HARQ process information comprises a number of HARQ processes for the persistent resource allocation.

7. The method of claim 5, wherein the time information is determined by a System Frame Number (SFN) and sub-frame number.

8. The method of claim 5, further comprising:

determining whether there is a transmission of L1/L2 control information for the data;

if there is no transmission of the L1/L2 control information, transmitting the data using the determined HARQ process ID and the resource allocated according to the persistent resource allocation interval information;

if there is a transmission of the L1/L2 control information, setting the HARQ process ID in the L1/L2 control information; and transmitting the L1/L2 control information.

9. An apparatus for transmitting and receiving data in a communication system supporting Hybrid Automatic Repeat reQuest (HARQ), the apparatus comprising:
- a receiver for receiving a HARQ process information, a persistent resource allocation interval information, and data through a resource allocated according to the persistent resource allocation interval information;
- a controller for calculating a HARQ process identifier (ID) using the HARQ process information, the persistent resource allocation interval information, and a time information; and
- a HARQ process for performing a HARQ operation for the received data from the receiver corresponding to the HARQ process ID,
- wherein the controller calculates the HARQ process ID by the following equation, HARQ process ID=s modulo n where the s is an integer derived from t/i, wherein the t is the time information, the i is the persistent resource allocation interval information, and the n is the HARQ process information.

10. The apparatus of claim 9, wherein the HARQ process information comprises a number of HARQ processes for a persistent resource allocation.

11. The apparatus of claim 9, wherein the time information is determined by a System Frame Number (SFN) and sub-frame number.

12. The apparatus of claim 9, wherein the controller determines if there is a transmission of L1/L2 control information, if there is no transmission of the L1/L2 control information, the controller calculates the HARQ process ID using the HARQ process information, the persistent resource allocation interval information and a time information and the receiver delivers the received data to a HARQ process corresponding to the calculated HARQ process ID, if there is transmission of the L1/L2 control information, the receiver receives data according to the L1/L2 control information and delivers the received data to a HARQ process corresponding to the L1/L2 control information.

13. An apparatus for transmitting and receiving data in a communication system supporting Hybrid Automatic Repeat reQuest (HARQ), the apparatus comprising:
- a controller for determining a HARQ process identifier (ID) by a HARQ process information, a persistent resource allocation interval and a time information;
- a transmitter for transmitting the HARQ process information, the persistent resource allocation interval information, and data through a persistent resource allocated according to the persistent resource allocation interval information;
- a HARQ process for storing the data based on the HARQ process ID, wherein the controller calculates the HARQ process ID by the following equation, HARQ process ID=s modulo n
- where the s is an integer derived from t/i, wherein the t is the time information, the i is the persistent resource allocation interval information, and the n is the HARQ process information.

14. The apparatus of claim 13, wherein the HARQ process information comprises a number of HARQ processes for the persistent resource allocation.

15. The apparatus of claim 13, wherein the time information is determined by a System Frame Number (SFN) and sub-frame number.

16. The apparatus of claim 13, wherein the controller determines if there is a transmission of L1/L2 control information for the data, if there is no transmission of the L1/L2 control information, the transmitter transmits the data using the determined HARQ process ID and the resource allocated according to the persistent resource allocation interval information, if there is a transmission of the L1/L2 control information, the controller sets the HARQ process ID in the L1/L2 control information and the transmitter transmits the L1/L2 control information.

* * * * *